US009533621B1

(12) United States Patent
Rees

(10) Patent No.: US 9,533,621 B1
(45) Date of Patent: Jan. 3, 2017

(54) REAR BUMPER STEP

(71) Applicant: Mark E. Rees, Naugatuck, CT (US)

(72) Inventor: Mark E. Rees, Naugatuck, CT (US)

( * ) Notice: Subject to any disclaimer, the term of this patent is extended or adjusted under 35 U.S.C. 154(b) by 0 days.

(21) Appl. No.: 14/968,193

(22) Filed: Dec. 14, 2015

Related U.S. Application Data

(60) Provisional application No. 62/090,999, filed on Dec. 12, 2014.

(51) Int. Cl.
B60D 1/06 (2006.01)
B60R 3/00 (2006.01)

(52) U.S. Cl.
CPC .............. B60R 3/007 (2013.01); B60D 1/06 (2013.01)

(58) Field of Classification Search
CPC ............ B60R 3/002; B60R 3/007; B60D 1/04
See application file for complete search history.

(56) References Cited

U.S. PATENT DOCUMENTS

| 3,159,242 | A |   | 12/1964 | James |   |
|---|---|---|---|---|---|
| 3,357,719 | A |   | 12/1967 | McCrea |   |
| 4,089,276 | A |   | 5/1978 | Enos |   |
| D263,132 | S |   | 2/1982 | Mitchell |   |
| 4,405,141 | A |   | 9/1983 | Jurek |   |
| 4,753,447 | A |   | 6/1988 | Hall |   |
| 5,829,774 | A | * | 11/1998 | Klemp | B60R 3/007 |
|   |   |   |   |   | 280/164.1 |
| 6,170,842 | B1 |   | 1/2001 | Mueller |   |
| 6,416,112 | B1 | * | 7/2002 | Trivits | B60J 11/06 |
|   |   |   |   |   | 296/136.07 |
| 7,448,637 | B2 |   | 11/2008 | Parker |   |
| 2003/0011164 | A1 | * | 1/2003 | Cipolla | B60R 3/007 |
|   |   |   |   |   | 280/164.1 |

* cited by examiner

Primary Examiner — John Walters
Assistant Examiner — James Triggs
(74) Attorney, Agent, or Firm — Robert C. Montgomery; Montgomery Patent & Design, LLC

(57) ABSTRACT

A hitch step is adapted to be attached into a standard receiver-type hitch of a pickup truck, or other similarly equipped vehicle. The device is an attachable step enabling one to gain access to a rear portion of the vehicle. The device is configured to accommodate a variety of vehicles and step widths.

18 Claims, 5 Drawing Sheets

REAR BUMPER STEP

RELATED APPLICATIONS

The present invention is a continuation of, was first described in, and claims the benefit of U.S. Provisional Application No. 62/090,999, filed Dec. 12, 2014, the entire disclosures of which are incorporated herein by reference.

FIELD OF THE INVENTION

The present invention relates generally to a step-up bumper assembly designed to attach to a hitch of a vehicle.

BACKGROUND OF THE INVENTION

With sales at an all-time high, the popularity of the pick-up style truck as an everyday vehicle is more wide spread than it ever has been. Their utility and convenience in hauling items coupled with the availability of luxury interiors and extended cab space have made the pickup a popular alternative to other vehicles. The availability of aftermarket accessories also enhances the attractiveness of pickup trucks as well. Several of these aftermarket products, such as hitch steps, bumper platforms, and running boards, are designed to improve access to various interior and exterior areas on the vehicle. While they do their job fairly well, they are very utilitarian in appearance, and even tend to detract from the appearance of the vehicle. Accordingly, there exists a need for a means by which a hitch step can be provided with an enhanced visual appearance. The use of the present invention provides access to all points of a motor vehicle in a manner which is not only quick, easy, and effective, but stylish as well.

SUMMARY OF THE INVENTION

It is therefore an object of the present invention to provide such a step that is capable of being removably attached to a hitch receiver of a vehicle. The step comprises a hitch adapter, a hitch block having a bottom surface attached to the hitch adapter, and at least one (1) step plate affixed to an upper surface of the hitch block.

Another object of the present invention is to provide such a hitch adapter having an insert tube with a pin receiver capable of being removably attached to the hitch receiver, a support tube having a support plate attachable to the hitch block, and an offset tube attached to and spanning between the insert tube and the support tube. The offset tube has a pair of angles that offsets the insert tube from the support tube to maintain a parallel arrangement therebetween. A limit plate is also provided, disposed about a periphery of the insert tube between the pin aperture and the offset tube. The limit plate limits the travel of the insert tube inside the hitch receiver. In at least one (1) embodiment, the hitch adapter is provided as a unitary embodiment.

Another object is to provide such a hitch block that is generally a rectangular polyhedron. In at least one (1) embodiment, the hitch block is a hardwood.

Yet another object is to provide such a step plate that is generally rectangular. In various embodiments, the step plate is either a diamond plate or a four-way safety plate. Other embodiments also provided for a plurality of step plates. In all embodiments, it is preferred that the singular step plate or plurality of step plates are arranged so they are centrally located on the hitch block.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
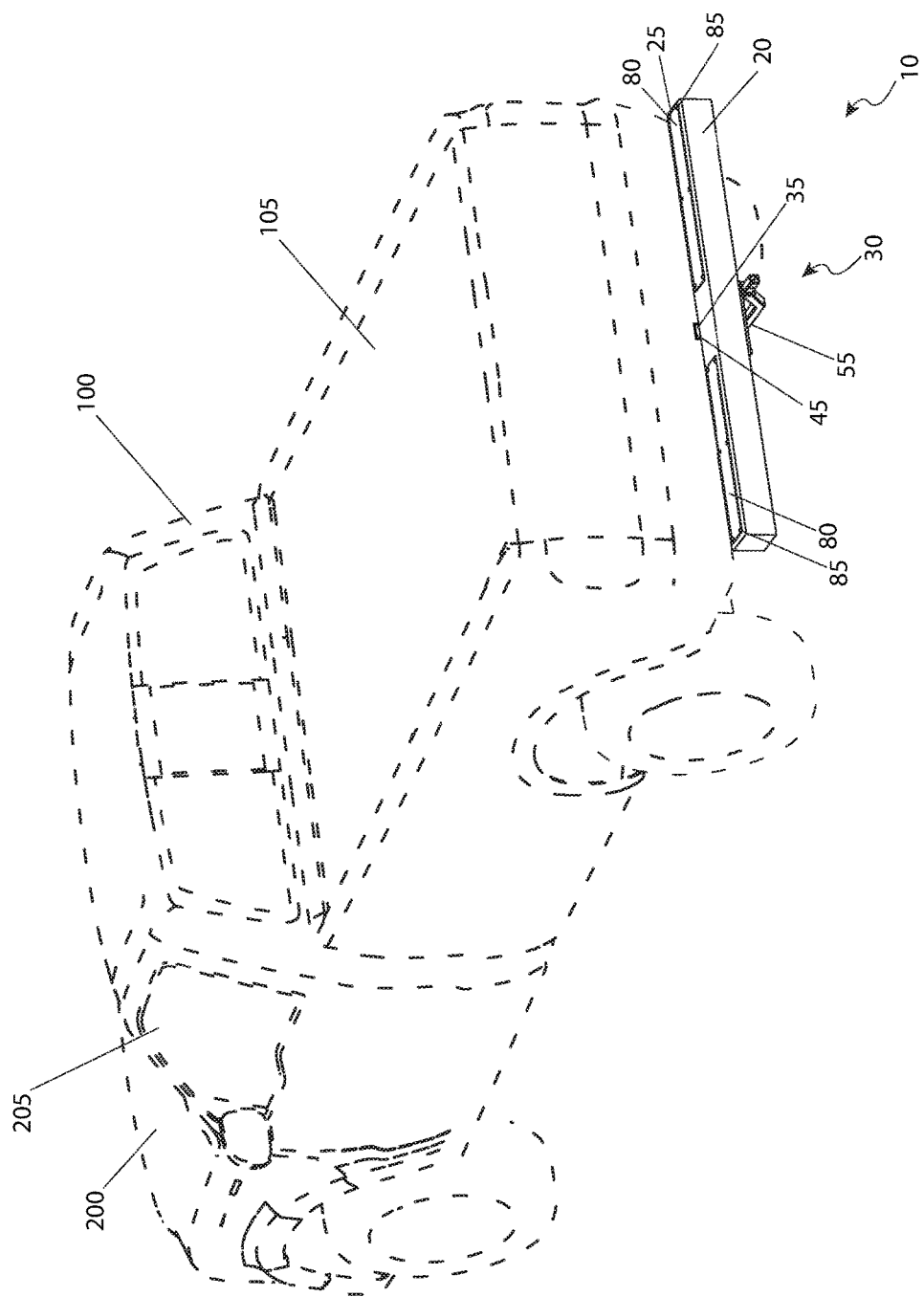
FIG. 1 is an environmental top perspective view of a hitch step 10 in accordance with the preferred embodiment of the present invention, showing a pair of step plates 80.

10 hitch step
20 hitch block
25 ledge
30 hitch adapter
35 insert tube
40 tube aperture
45 limit plate
50 offset tube
55 support tube
60 support plate
65 plate aperture
70 block fastener
80 step plate
85 plate aperture
90 unitary step plate
100 vehicle
105 vehicle cargo area

DETAILED DESCRIPTION OF THE PREFERRED EMBODIMENT

Figure 2:
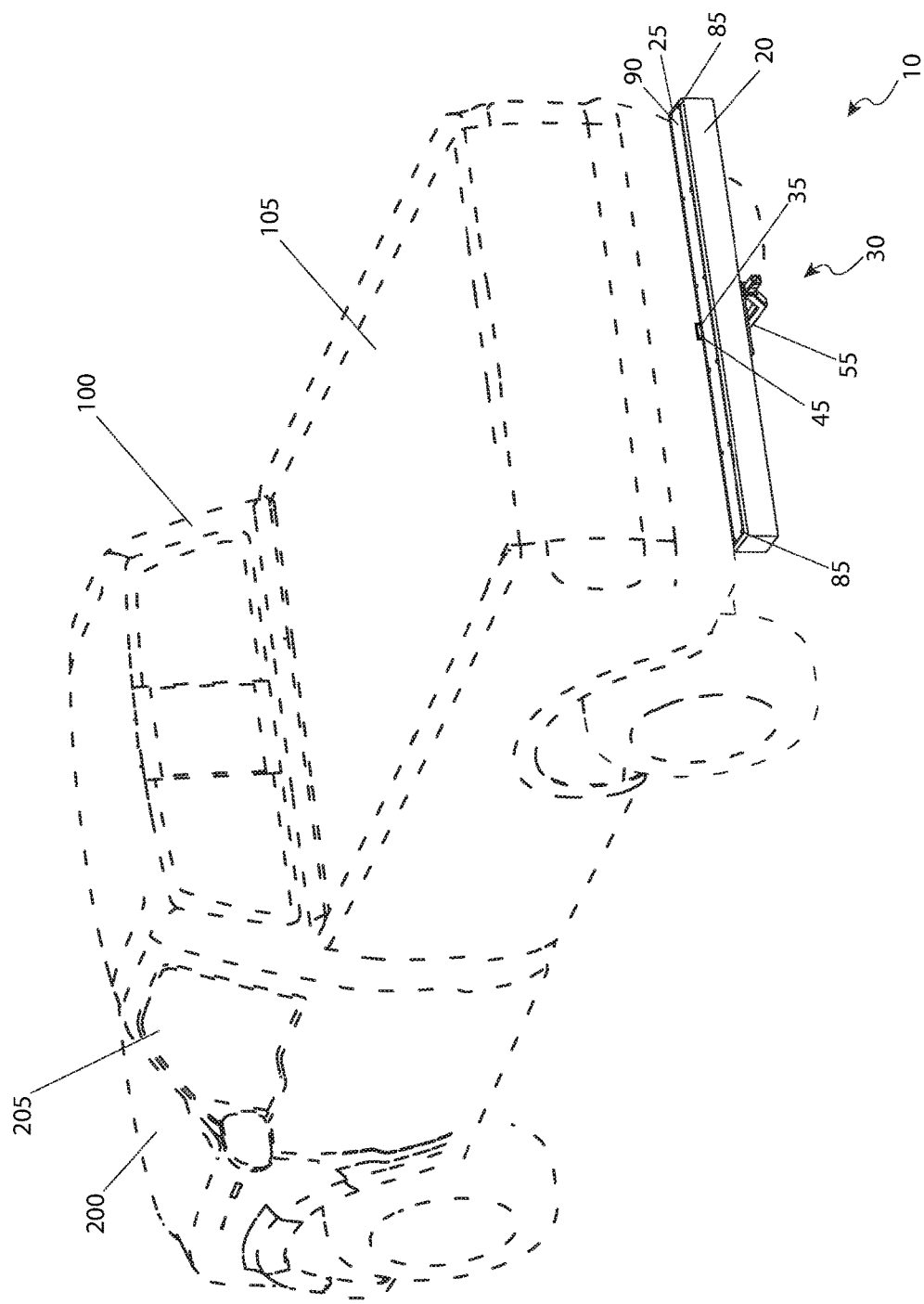
FIG. 2 is an environmental top perspective view of the hitch step 10 in accordance with an alternate embodiment of the present invention, showing a unitary step plate 90.
Figure 3:
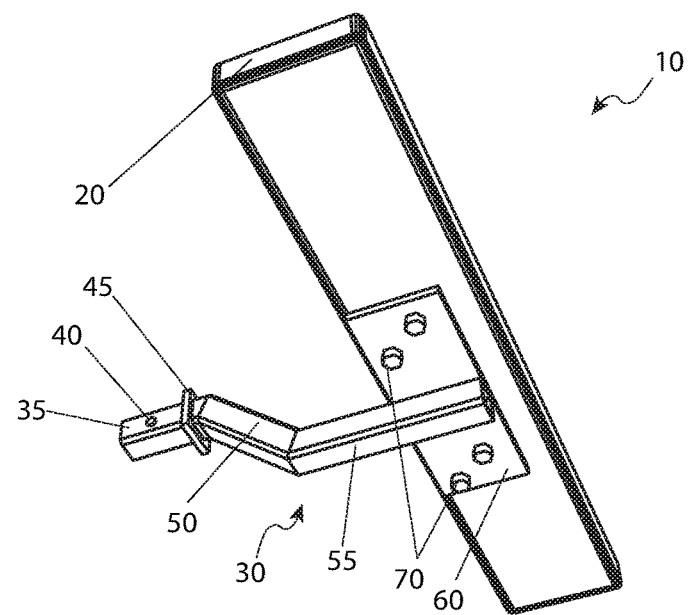
FIG. 3 is bottom perspective view of the hitch step 10 in accordance with the preferred embodiment of the present invention.
Figure 4:
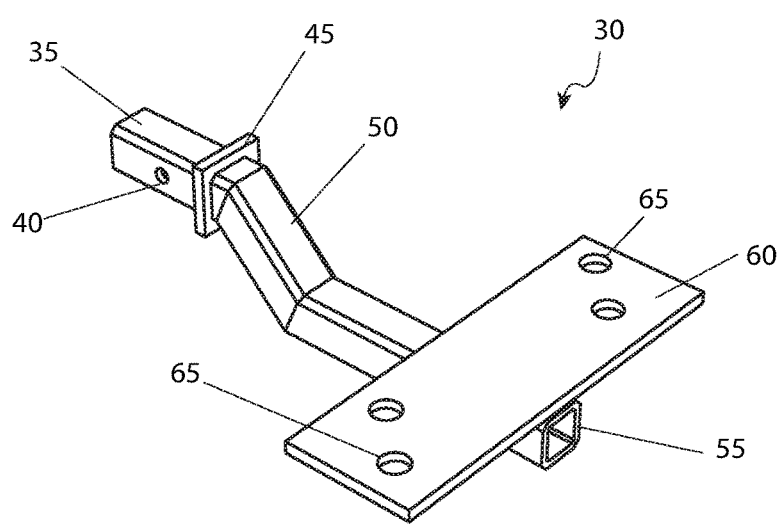
FIG. 4 is a front perspective view of the hitch adapter 30 in accordance with the preferred embodiment of the present invention.
Figure 5:
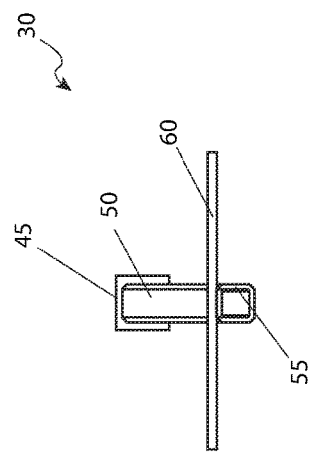
FIG. 5 is a front elevation view of the hitch adapter 30 in accordance with the preferred embodiment of the present invention.
Figure 6:
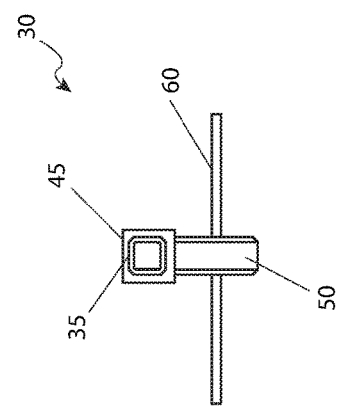
FIG. 6 is a rear elevation view of the hitch adapter 30 in accordance with the preferred embodiment of the present invention.
Figure 7:
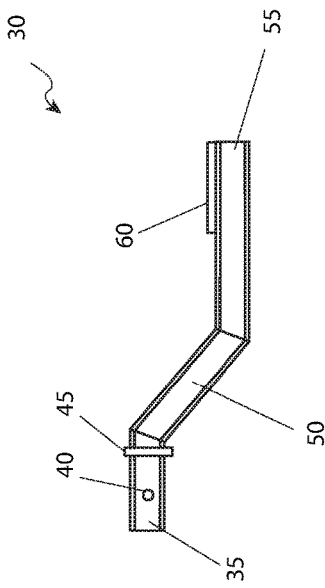
FIG. 7 is a first side elevation view of the hitch adapter 30 in accordance with the preferred embodiment of the present invention.
Figure 8:
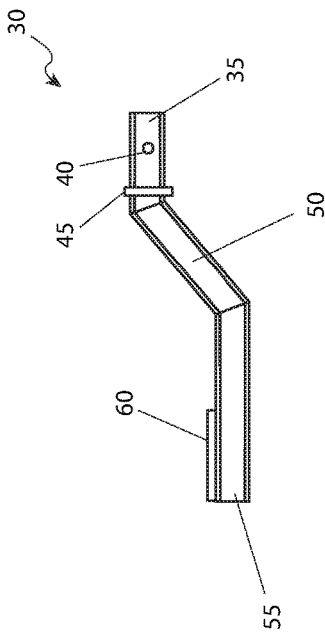
FIG. 8 is an opposite side elevation view of the hitch adapter 30 in accordance with the preferred embodiment of the present invention.
Figure 10:
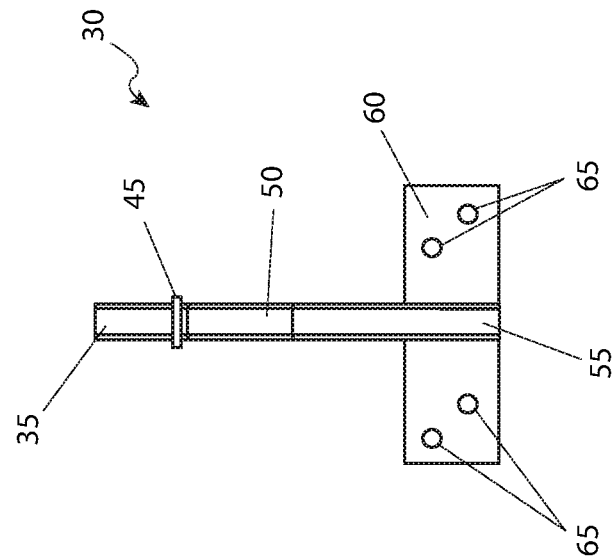
Figure 9:
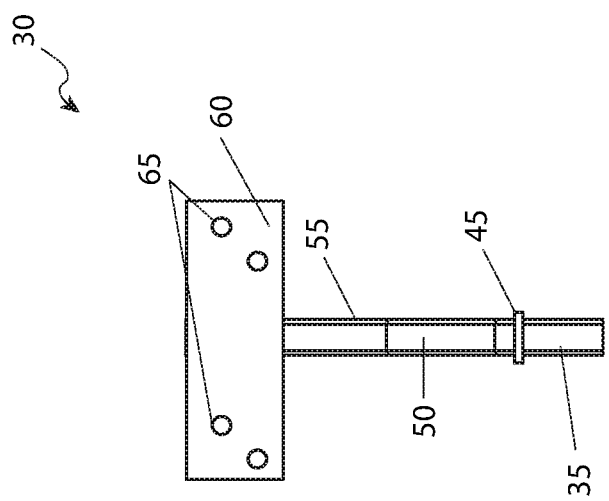
FIG. 9 is a top plan view of the hitch adapter 30 in accordance with the preferred embodiment of the present invention; and, FIG. 10 is a bottom plan view of a hitch adapter 30, from an under side, in accordance with the preferred embodiment of the present invention.

The best mode for carrying out the invention is presented in terms of its preferred embodiment, herein depicted within FIGS. 1 and 3-10. An alternate embodiment is depicted in FIG. 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a hitch step (herein referred to as the "system") 10, which primarily provides a ledge 25 preferably composed of a hardwood hitch block 20 capable of supporting a user's weight, attached to a hitch of a vehicle 100. The user may more easily be able to gain access to elevated portions of that vehicle 100, such as a vehicle cargo area 105. The ledge 25 may also serve other utility purposes, such as, but not limited to, a seating area, or an additional cargo-carrying platform. Due to the outboard positioning of various segments, the system 10 may also serve as a deflector of incidental contact for the vehicle 100. The terms "front" and "back" or "rear" are used consistent with the front and back/rear directions of the vehicle 100 to which the system 10 may be attached.

Referring now to FIGS. 1 and 3-10, major projection views and isometric views of the system 10, according to the preferred embodiment of the present invention, are disclosed. The system 10 includes a hitch adapter 30 and a wooden hitch block 20. The hitch block 20 is configured to be a rectangular polyhedron composed of any of a variety of hardwoods typically utilized for wooden support structures. The hitch block 20 may be rough-hewn, or planed and sanded, with any type of coating, or treatment, to inhibit deterioration and provide aesthetic appeal as may suit the taste of a particular user. The wooden hitch block 20 preferably has a cross-sectional size of nominally three inches (3 in.) high by eight inches (8 in.) thick. It is understood that other nominal sizes may be accommodated in any other embodiment without limiting the scope of the system 10.

An upper surface of the hitch block 20 is a horizontal plane generally referred to as a ledge 25. The ledge 25 may be provided with a step plate 80, 90 to improve traction on the ledge 25. The step plate 80, 90 may be a diamond plate or a four-way safety plate in order to achieve this improved traction. The step plate 90 may be disposed upon the ledge 75 as a single piece as is shown in FIG. 2, or may be divided into a plurality of step plates 80 (such as a pair of step plates 80 as in a preferred embodiment) spaced over the surface of the ledge 25 in some manner. The unitary step plate 90 is envisioned as encompassing the same area as all of the preferred step plates 80 plus all the gaps therein. The step plate 80, 90 is attached to the ledge 25 by means of a plurality of fasteners each passing through one (1) of a plurality of plate fasteners 85 aligned with a fastener of the ledge 25 (not shown). The system 10 may be adapted to span any portion of the rear of the vehicle 100 to suit the purposes and taste of a user.

Referring now to FIGS. 4-10, isolated views of a hitch adapter 30 according to the preferred embodiment of the present invention, is disclosed. The hitch adapter 30 is configured to have an insert tube 35 at a proximal end sized to removably fit within any standard category receiver-type hitch on a vehicle 100 without limiting the scope of the system 10. The insert tube 35 is provided with a pin aperture 40 into which a standard hitch pin, commensurate with the specific category hitch utilized on the vehicle 100, can be inserted to secure the hitch adapter 30. A distal end of the hitch adapter 30 has a support tube 55, which may be an extension of the insert tube 35. In a preferred embodiment, the support tube 55 and the insert tube 35 are separate pieces attached to each other by an offset tube 50, which results in the longitudinal axes of the insert tube 35 and the support tube 55 lying along disparate horizontal planes. The offset tube 50 may be disposed at any angle, up to ninety degrees (90°) to influence the distance between the longitudinal centerline of insert tube 35 and that of the support tube 55. The insert tube 35, the offset tube 50, and the support tube 55 are preferably composed of structural steel tubing and joined together by a welding process. It is understood that other materials, such as metallic bars, or other structural shapes, may be utilized without limiting the scope of the system 10.

A limit plate 45 is attached to the insert tube 35 so as to govern the depth to which the insert tube 35 may be installed within the receiver-type hitch as well as partially covering that aperture so as to inhibit the entrance of debris and contaminants which may have a deleterious effect. The limit plate 45 may be comprised of a single plate having an accommodating aperture (not specifically shown) through which the insert tube 35 is routed, or a plurality of plates affixed to the insert tube 35, preferably by welding, to serve the intended purpose. A rectangular, planar support plate 60 is attached, preferably by welding, to an upper face of the support tube 55. The support plate 60 is configured to lie in a perpendicular plane to the longitudinal centerline of the support tube 55. The support plate 60 is provided with a plurality of plate apertures 65 through which block fasteners 70 are routed for the removable attachment of the hitch block 20. The support plate 60 is fastened to a lower face of the hitch block. The block fasteners 70 are configured to be lag bolts of an appropriate size to retain the hitch block 20 and withstand the normal forces placed thereon.

The preferred embodiment of the present invention can be utilized by the enabled user in a simple and straightforward manner with little or no training. After initial purchase or acquisition of the system 10, it would be installed as indicated either in FIG. 1 or 2. The method of installing and utilizing the system 10 may be achieved by performing the following steps: acquiring a model of the system 10 having a desired style to suit the taste of a user; inserting the insert tube 35 into the hitch receiver; utilizing the ledge 25 to access a desired portion of the vehicle cargo area 105 by stepping onto and standing upon the ledge 25. The ledge 25 may also be utilized as a seat, or as a horizontal support for other selected items. The system 10 may provide some damage reduction benefit to the vehicle 100 in an entirely passive manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A removably attachable hitch step, comprising:
   a hitch adapter, comprising:
      an insert tube, having a first end capable of being removably inserted within a hitch receiver of a vehicle and a second end;
      a pin aperture located adjacent to said first end capable of receiving a hitch pin to secure said hitch adapter to said hitch receiver;
      a limit plate disposed about an outer periphery of said insert tube, intermediate between said pin aperture and said insert tube second end;
      a support tube disposed parallel to said insert tube, further having a first end;
      an offset portion affixed to and spanning a distance between said insert tube second end and a second end of said support tube, said offset portion extending away from said insert tube and said support tube; and,
      a planar support plate disposed on a first surface of said support tube, comprising an attachment means enabling removable attachment of a bottom surface of a hitch block thereto;
   a pair of step plates, each affixed to an upper surface of said hitch block.

2. The step of claim 1, wherein said hitch adapter is a unitary embodiment.

3. The step of claim 1, wherein said hitch block is configured as a rectangular polyhedron.

4. The step of claim 3, wherein said hitch block is composed of a hardwood.

5. The step of claim 1, wherein each step plate is a diamond plate or a four-way safety plate.

6. The step of claim 1, wherein said pair of step plates are located at equidistant positions on either side of an axial centerline.

7. The step of claim 6, wherein each step plate is a diamond plate or a four-way safety plate.

8. The step of claim 6, wherein each step plate is a rectangular planar body.

9. The step of claim 8, wherein each step plate is a diamond plate or a four-way safety plate.

10. A removably attachable hitch step, comprising:
    a hitch adapter, comprising:
       an insert tube, having a first end capable of being removably inserted within a hitch receiver of a vehicle and a second end;
       a pin aperture located adjacent to said first end capable of receiving a hitch pin to secure said hitch adapter to said hitch receiver;
       a limit plate disposed about an outer periphery of said insert tube, intermediate between said pin aperture and said insert tube second end;
       a support tube disposed parallel to said insert tube, further having a first end;
       an offset portion affixed to and spanning a distance between said insert tube second end and a second end of said support tube, said offset portion extending away from said insert tube and said support tube; and,
       a planar support plate disposed on a first surface of said support tube, comprising an attachment means enabling removable attachment of a bottom surface of a hitch block thereto;
    and,
    a step plate affixed to an upper surface of said hitch block.

11. The step of claim 10, wherein said hitch adapter is a unitary embodiment.

12. The step of claim 10, wherein said hitch block is configured as a rectangular polyhedron.

13. The step of claim 12, wherein said hitch block is composed of a hardwood.

14. The step of claim 10, wherein said step plate is a diamond plate or a four-way safety plate.

15. The step of claim 10, wherein said step plate is centrally positioned on said hitch block.

16. The step of claim 15, wherein said step plate is a diamond plate or a four-way safety plate.

17. The step of claim 15, wherein each step plate is a rectangular planar body.

18. The step of claim 17, wherein said step plate is a diamond plate or a four-way safety plate.

* * * * *